United States Patent

[11] 3,608,798

[72] Inventor William F. Lawless
Los Angeles, Calif.
[21] Appl. No. 819,815
[22] Filed Apr. 28, 1969
[45] Patented Sept. 28, 1971
[73] Assignee MCA Technology, Inc.
Santa Monica, Calif.

[54] TAPE LOOP BIN APPARATUS AND SYSTEM
11 Claims, 13 Drawing Figs.

[52] U.S. Cl. .......... 226/25, 226/176, 226/195, 226/100, 226/35, 226/44, 328/72
[51] Int. Cl. .......... B65h 23/18
[50] Field of Search .......... 226/25, 42, 44, 24, 43, 34, 35, 195, 176; 324/68; 100/179.2 E; 318/6

[56] References Cited
UNITED STATES PATENTS

| | | | |
|---|---|---|---|
| 3,112,052 | 11/1963 | Johnson | 226/25 UX |
| 3,298,006 | 1/1967 | Milenkovic et al. | 179/100.2 E |
| 3,375,963 | 4/1968 | Wang et al. | 226/178 |
| 3,415,434 | 12/1968 | Bolick, Jr. | 226/44 |

*Primary Examiner*—Allen N. Knowles
*Attorney*—Golove, Kleinberg & Morganstern

ABSTRACT: A tape loop bin storage apparatus is provided in which an endless magnetic tape, or other elongated flexible tape, is stored in serpentine folds in a bin or magazine, and which may be used in conjunction with a master recorder/reproducer. The improved loop bin storage apparatus of the invention incorporates many unique features which are of general utility in the magnetic recorder/reproducer art. For example, the apparatus includes an improved timing system which facilitates the recording of programs on the tape and the subsequent reproduction of such programs by the master recorder; and the storage apparatus further includes improved components for controlling and guiding the endless tape in and out of the storage bin.

INVENTOR:
William F. Lawless
Jessup and Beecher
By Keith D. Beecher
ATTORNEYS

INVENTOR:
William F. Lawless
Jessup and Beecher
By Keith D. Beecher
ATTORNEYS

INVENTOR:
William F. Lawless
Jenny and Beecher
By Keith D. Beecher
ATTORNEYS

INVENTOR:
William F. Lawless
Jessup and Beecher
By Keith D. Beecher
ATTORNEYS

INVENTOR:
William F. Lawless

By Jessup and Beecher
Keith D. Beecher
ATTORNEYS

FIG. 8 (Counter 204 & Comparator 202)

INVENTOR:
William F. Lawless
Jessup and Beecher

By Keith D. Beecher
ATTORNEYS

INVENTOR:
William F. Lawless
Jessup and Beecher
By Keith D. Beecher
ATTORNEYS

INVENTOR:
William F. Lawless
Jenny and Beecher
By Keith D. Beecher
ATTORNEYS

INVENTOR:
William F. Lawless
Jessup and Beecher
By Keith D. Beecher
ATTORNEYS

INVENTOR:
William F. Lawless
Jessup and Beecher

By Keith D. Beecher

ATTORNEYS

TAPE LOOP BIN APPARATUS AND SYSTEM

BACKGROUND OF THE INVENTION

The apparatus of the invention is of the general type described in copending application Ser. No. 696,869, now U.S. Pat. No. 3,499,589 which was filed Jan. 10, 1968, in the name of Keith O. Johnson et al., and which is assigned to the present assignee. The apparatus of the invention, as mentioned above, is intended to be used in conjunction with a master recorder, and it is controlled so that the endless tape in the bin storage apparatus of the invention may be run continuously past the record/reproduce magnetic transducer heads of the master recorder.

The general type of apparatus with which the present invention is concerned has the advantage in that there is no need to interrupt the recording or reproducing process while the tape is being rewound, as is the case in the usual magnetic recorder which is equipped with a supply reel and a takeup reel for the tape. The apparatus of the present invention finds utility, for example, in the music-recording industry. In that industry, it is usual to provide a master magnetic tape for storing a particular musical program, and the program is duplicated on a multiplicity of duplicate tapes for distribution and sale, this being achieved by separate slave recording units which respond to signals from the master recorder/reproducer. The apparatus of the invention also finds utility in instrumentation and data processing systems, and in general in any environment requiring the efficient storage of information.

It is usual in apparatus of the general type with which the present invention is concerned to store a flexible magnetic recording tape in serpentine folds in an appropriate bin or magazine. The apparatus described in the aforesaid copending application is constructed to overcome certain problems which are prevalent in the prior art in conjunction with such storage apparatus. The major problem is tape sticking and damage caused by static electricity between the folds of the tape in the bin, and between the tape and the walls of the bin. The apparatus of the copending application reduces the effects of static electricity to a minimum, so as to increase the possible maximum running times, and maximum tape speeds of the apparatus, and which also prevents any tendency for the tape to stick, twist or break.

The apparatus described in the copending application has its magazine mounted in a horizontal plane, rather than in a vertical plane, so that the magnetic recording tape is supported in a generally upright condition, with its lower edge resting on the horizontal bottom of the magazine. In this way, the weight of the tape does not force folds of tape together at the bottom of the magazine, as is the case when the magazine is in a vertical position; and there is minimum electrostatic reaction between the individual folds of the tape, as well as between the tape and the bottom of the magazine, in the apparatus of the copending application. The apparatus of the copending application also uses pneumatic means to assure the smooth feed of the tape into and out of the magazine.

The apparatus of the present invention, in the embodiment to be described, incorporates the aforesaid features of the apparatus of the copending application. In addition, and as mentioned above, the apparatus of the invention incorporates other features which will be described in detail herein, and which have general utility in the magnetic recording and reproducing art.

As will be described, the movement of the magnetic tape in the unit of the invention is controlled by means of a precision capstan, which is driven in a manner to eliminate the damaging effects of tugging, pulling and creasing on the magnetic tape. This is achieved by causing the capstan drive motor to operate in a saturated condition, so that it will come up to the tape speed of the master and will then exhibit constant torque for constant tape tension, independent of speed.

Flutter isolation of the storage apparatus from the master recorder transport is provided by a high-response flutter filter system which will be described, and which insures that the overall flutter performance of high-quality open-loop or closed-loop audio transport will not be degraded when such transports are used in conjunction with the apparatus of the present invention.

Also to be described is an improved control system for the tape storage apparatus which permits the simple and rapid entry of information onto a plurality of duplicate tapes in a master and slave recording system, and which minimizes the time required for sequencing the operations in such a system. Moreover, it will become evident as the description proceeds that the control system has general utility in timing and controlling tape transport operations.

DETAILED DESCRIPTION OF THE ILLUSTRATED EMBODIMENTS

Figure 1:
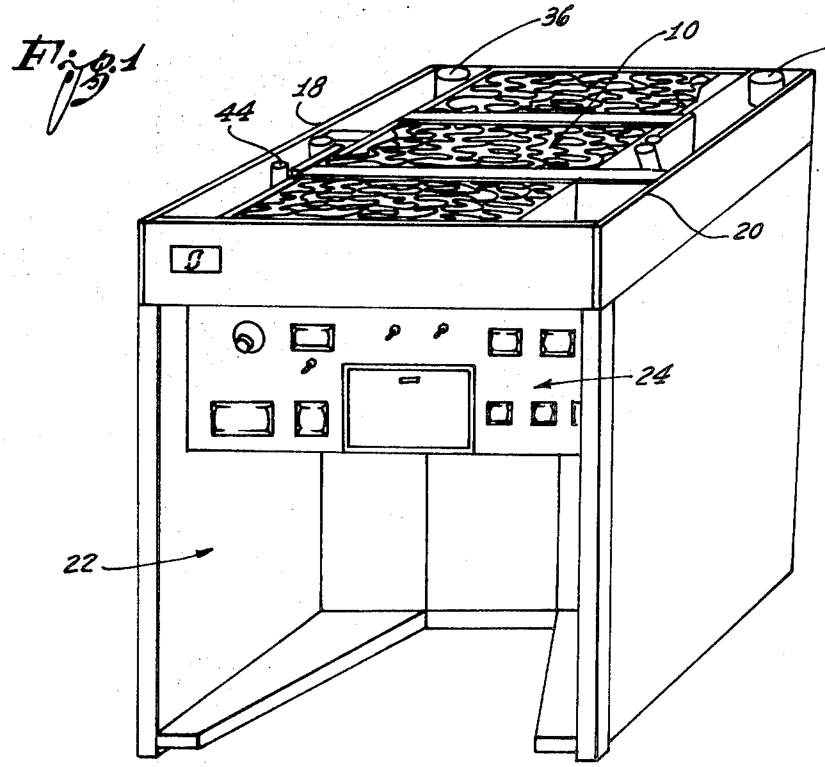
FIG. 1 is a front and top perspective view of a console embodiment of the storage apparatus of the present invention.
Figure 2:
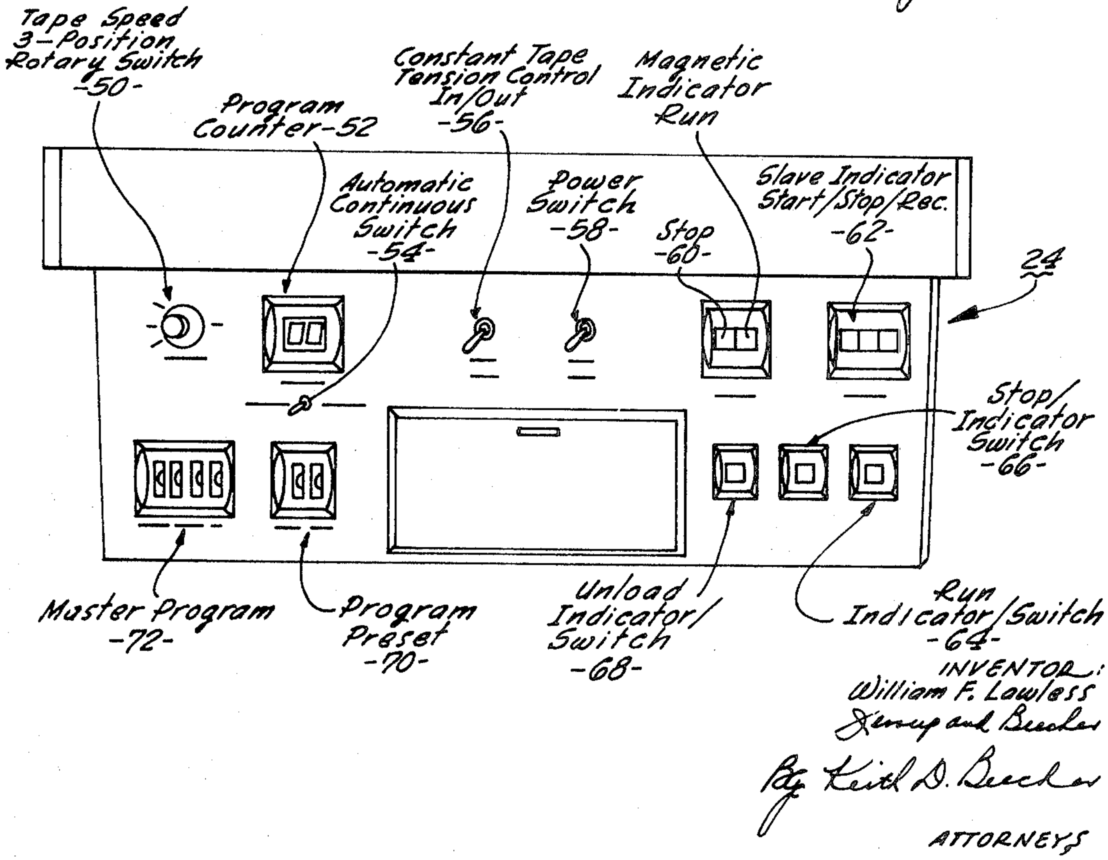
FIG. 2 is a more detailed representation of the control panel included in the console of FIG. 1.
Figures 3, 4:
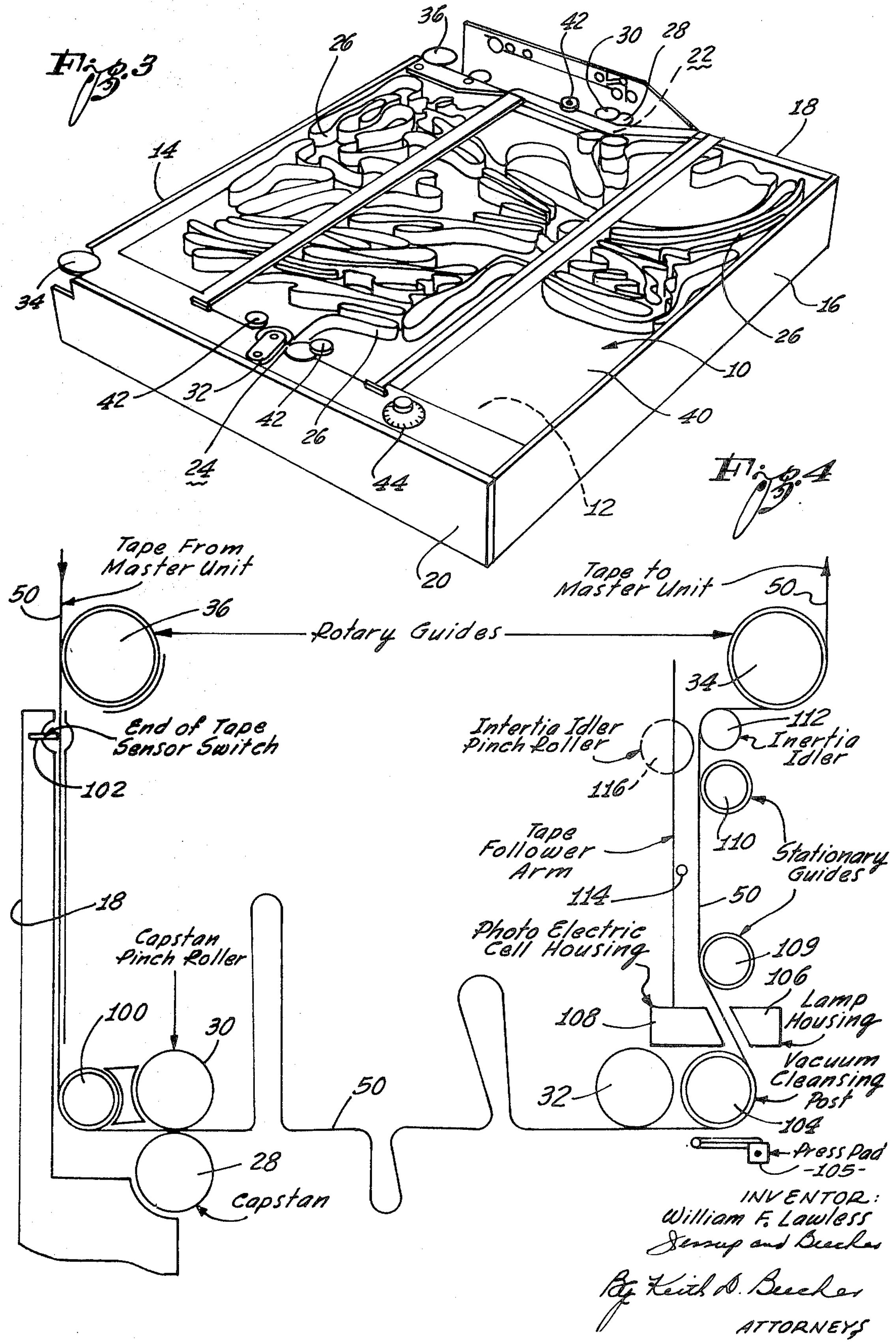
FIG. 3 is a top perspective view showing the actual storage bin or magazine which is included in the console shown in FIG. 1.
FIG. 4 is a schematic representation of various components utilized in the apparatus of the invention, and of the tape path with respect to such components.

The apparatus of the invention as shown, for example, in FIGS. 1–3 includes a tape storage magazine 10. The magazine 10 includes, for example, a bottom 12, a pair of sidewalls 14 and 16, and a pair of end walls 18 and 20 (FIG. 3). The magazine 10 is supported on a console base 22 (FIG. 1) in a generally horizontal plane. A control panel 24 is provided on the top of the base 22, the control panel being shown in greater detail in FIG. 2.

As described in the copending application and with reference now particularly to FIG. 3, a plenum chamber is formed under the magazine 10, and air is introduced under pressure to the plenum chamber from any appropriate source. The end walls 18 and 20 are formed to encompass respective manifolds which are positioned over the plenum chamber, and which have apertures extending through the bottom 12 of the magazine and communicating with the plenum chamber.

The wall 18, for example, has a central slot 22 which constitutes an entrance slot for the tape, and the end wall 20 has a slot 24 which constitutes the exit slot for the tape. Apertures are provided in the aforesaid manifolds, and as described in detail in the copending application, to direct streams of pressurized air against the side of the tape as it is drawn into and out of the magazine, so as to cushion the tape on a film of air, and assure gentle tape handling at high speeds.

As shown in FIG. 3, for example, the magnetic recording medium 26 which, as described above, is an endless flexible magnetic tape, is fed through the entrance slot 22 by means of a capstan drive spool 28. The capstan drive spool is driven, for example, by an electric motor. An idler roller 30 is selectively moved by an appropriate solenoid control against the capstan spool 28 to press the tape against the spool and cause it to be fed into the magazine. The tape is drawn out of the exit port 24 around a guide roller 32 and through other components which are hidden in FIG. 3, but which will be described subsequently. The tape then passes around a guidepost 34 and travels to the master recording unit transport (not shown). After the tape has passed across the heads of the master recorder, it returns to the entrance slot 22 around a further guidepost 36.

It will be appreciated that the tape 50 is stored within the magazine 10 in a series of serpentine folds, as shown in FIGS. 1 and 3, and is supported on the bottom 12 of the magazine in a horizontal plane and in an upright condition. This, as mentioned above, minimizes the electrostatic attractions between the folds of the tape and between the tape and the bottom and walls of the magazine. The magazine may be covered by an appropriate glass top 40, the top being removable and held in place, for example, by means of a series of thumbscrews 42. The pressure of the air in the magazine may be controlled by a control knob 44.

As mentioned above, the various controls for the apparatus of the invention, apart from the valve control 44 of FIG. 3, are mounted on the front panel 24, shown in FIG. 2. These controls include, for example, a three-position rotary switch 50 for controlling the speed normalization circuit, so as to set the tape speed in the storage unit at the same level as that of the master unit. A two-place digital readout 52 is also included for indicating the number of programs completed by the tape loop.

In this respect, it might be pointed out that, as subsequently used herein, a "lap" is defined as the tape travel occurring between successive detections of a transparent "window" which is formed in the tape. The tape window identifies the head of the length of tape which has been loaded into the storage apparatus, and the window is detected each time it passes a photoelectric cell housing, as will be described. Thus, a lap occurs each time the full length of tape in the storage bin has been transported through a complete threading pattern. The number of laps completed at any time is equal to the number of times that the tape window has been detected. A "-programm" is defined as a recorded lap, that is, the information recorded on the tape during each lap. A "run" is defined as the completion of a preset number of programs.

The control panel 24 of FIG. 2 also includes a two-position toggle switch 54 for selecting either automatic or continuous mode of operation of the storage apparatus. In the automatic mode, the system is controlled by a program preset control 70 which is a two-place digital thumb wheel switch control, and the preset control 70 is used to select the desired number of tape programs to be completed before tape motion is automatically stopped. In the continuous mode, the program preset control is bypassed and the tape motion continues until it is halted by a manual control.

The capstan 28 is driven by an electric motor which may be switched to exhibit the aforesaid desired constant torque characteristics so as to maintain constant tape tension as the tape is drawn into the storage apparatus without any need for electrical or other connections between the master and the storage apparatus.

A two-position toggle switch 56 is also included in the circuit of the drive motor for the capstan 28 for selecting or rejecting the constant torque control of the tension of the tape drawn into the storage apparatus from the associated master tape recorder transport. This control should be activated for all normal operation, and should be deactivated only for test or maintenance purposes. In the deactivated mode, the storage apparatus maintains a tape speed which is independent of the speed of the master recorder transport. A power switch 58 is provided, which is also a two-position toggle switch, and it serves to apply primary power to the storage apparatus.

An indicator 60 is illuminated to show the current status of the associated master recording unit. For example, a white light "stop" may be energized or a green light "run" may be energized. A similar indicator 62 is provided for indicating the status of the associated slave units. A white light "stop," for example, is illuminated, or a blue lamp "start," or a red lamp "record." A further group of indicators 64, 66 and 68 are also mounted on he panel, the latter indicators being of the pushbutton type.

For example, the pushbutton indicator 64 serves to select the "run" mode for the apparatus, and a red switch cap on the indicator is illuminated to indicate when the "run" mode is selected. This mode is used for loading tape into the storage apparatus and for normal operating tape motion during the duplicating or other processes.

The pushbutton indicator 66 is used to select the "stop" mode for the system. A white switch cap, for example, on the indicator 66 is illuminated to indicate when the "stop" mode is selected. In the "stop" mode, all tape motion ceases, and system operation is inhibited. The "stop" control should be operated under all abnormal conditions of tape stoppage, so that all the automatic circuits may be cleared and reset for subsequent operation of the tape. The pushbutton indicator 68 selects the "unload" mode for the storage apparatus. A white switch cap on the latter indicator, for example, is illuminated to indicate the "unload" mode, this is used to unload the tape from the storage apparatus.

As mentioned above, the program reset control 70 is a two-place digital thumb wheel switch control which is used to select the desired number of tape programs to be completed before tape motion is automatically arrested. This control is effective only when the automatic mode is selected by the switch 54. When the automatic mode is selected, tape motion is halted when the count indicated by the program counter, to be described, coincides with the setting selected at the program present thumb wheel switches 70.

A master program control 72 is also provided. This latter control comprises, for example, four-place digital thumb wheel switches with two places for setting "minutes" and two places for selecting "seconds." This latter control is used to set the duration of the program to be duplicated, and the settings are made in minutes and seconds of real-time playback.

As shown in FIG. 4, for example, the tape 50 from the master unit passes from the guide post 36 into a slot in the side 18, and around idler 100, and between the capstan 28 and pinch roller 30, into the interior of the storage bin. An end of tape sensor switch 102 is provided at the entrance to the slot in the end wall 18, and its function and purpose will be described.

The tape 50 passes from the storage bin around the guide roller 32, and around a vacuum cleaning post 104 and an associated pressure pad, which also will be described. The tape then passes between a lamp housing 106 and a photoelectric cell housing 108. As mentioned above, a transparent window is provided at a selected point in the endless tape, and each time the window passes through the housings 106 and 108, its presence is detected by appropriate electric circuitry.

The tape 50 then passes over a pair of stationary guides 109 and 110, and around an inertia idler 112, and around the guidepost 34 to the master unit. A tape follower arm 114 is provided which senses the tension in the tape between the guides 108 and 110, and controls an inertia idler pinch roller 116, with respect to the inertia idler 112, as also will be described.

Figure 5:
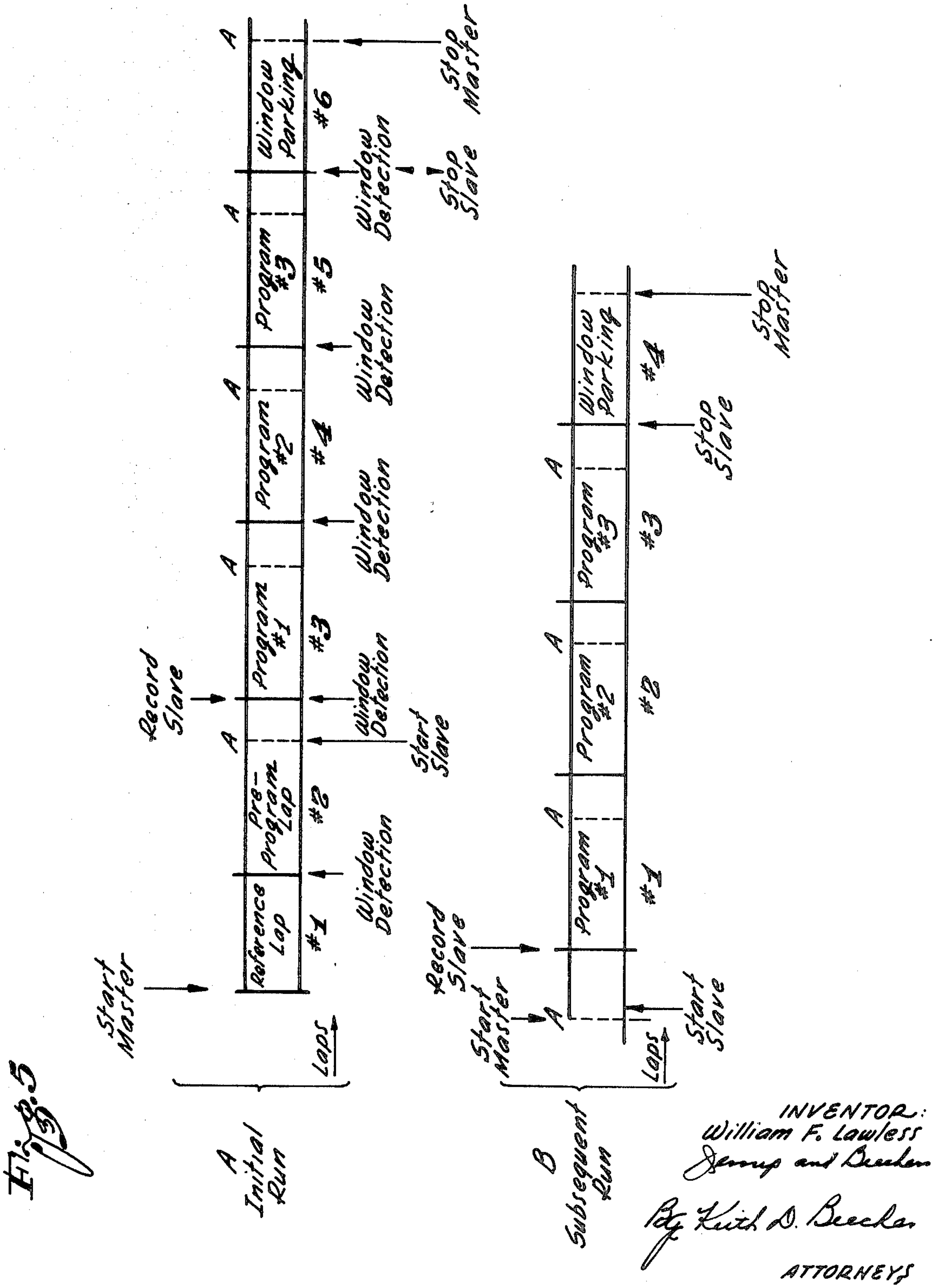
FIG. 5 is a diagram useful in explaining the control and timing system incorporated into the apparatus to be described.

After the apparatus is operational, three major events occur during a typical operation sequence, and these are designated as a lap, a program, and a run, all of which have been defined previously herein. FIG. 5 is a graphic summary of the key events occurring in a typical operational sequence and consists of an initial run and a subsequent run. The initial run is the first run completed after tape loading, and the subsequent run involves the same sequence occurring after the initial run.

Prior to the initial run of the tape in the apparatus described above, tape loading and all other preliminary operations must be completed. The tape is then shifted so that the aforesaid tape window is placed at some point, usually outside the magazine. At this point, the window has not yet been detected by the photocell in the housing 108, and there is as yet no window reference for the automatic programming functions of the apparatus.

The operator then starts the initial run, represented by the upper portion of FIG. 5, by depressing the "run" pushbutton indicator of FIG. 2, at which time tape motion begins and continues through a reference lap 01 until the window in the tape is detected, whereby a preprogram lap 02 is initiated.

The reference lap 01 is required to reference the automatic programming circuits and components of the apparatus with respect to the starting point of the tape. Since the reference lap 01 is of indeterminate length, sufficient data is not available at the end of the reference lap 01 to transmit start commands to the slave unit. This event occurs at a critical and adjustable point in time in the preprogram lap 02 following window detection, at the end of the reference lap 01, and is shown in FIG. 5 by the dotted line A in the preprogram lap 02.

The time A in each lap is adjustable, and it normally is made to occur approximately 10 seconds before the next window detection at the end of the particular lap, that is, before the beginning of the next lap. Thus, at approximately 10 seconds before the end of the preprogram lap 02, the start commands are applied to the slave units from the apparatus. The slave record commands are subsequently applied to the slave units at the end of the preprogram lap 02 (approximately 10 seconds later) to insure that the duplication process is synchronized with the beginning of the material to be recorded.

The delay provided between the initiation of the tape movement in the master and slave units and the beginning of the recording process, is to enable the slave and master units to attain full speed and stable operation before the recording process begins. Also, since the master unit operates at a higher speed than the slave units, slightly more time is required for the master unit to come up to speed. For that reason, the master start signal is applied somewhat before the slave start command as shown in the diagram of FIG. 5. This delay is also adjustable in accordance with specification duplication requirements.

At the end of the program lap 02 in the initial run of FIG. 5A, the circuits of the apparatus are properly referenced, and all the units are running at full speed and are stable in their operation. Therefore, at the beginning of lap 03 of the initial run, the record command is applied to the slave units and program 01 commences. At the end of lap 03, the program counter in the apparatus is incremented for the first time, and the program counter display 52 of FIG. 2 registers a 01 count. This action continues through the subsequent laps. Therefore, at the end of lap 04 of the initial run, the run count of the program counter is incremented to 02; and at the end of lap 05, the program counter display in incremented to 03 to show that program 03 has been completed. If it is assumed that a program count of 03 has been set into the apparatus by setting the program preset control 70 of FIG. 2 to 03; then the initial run will be completed at the end of lap 05.

At the end of lap 05 (program 03) of the initial run tape motion and recording commands to the slave units will be removed deactivating these units after a short delay of approximately 0.5 seconds to provide sufficient tape travel (about 3 feet). The apparatus of the invention will continue to feed tape through the master unit until the lap time A of the next lap 06 is detected (approximately 10 seconds before window detection). This additional tape motion positions the tape window within the magazine of the apparatus at a point where subsequent runs will not require a reference or preprogram lap as was the case with the initial run of FIG. 5A, thus saving two nonproductive laps on subsequent runs.

To start a subsequent run such as shown by the lower diagram B of FIG. 5, the operator presses the "run" pushbutton indicator 64 of FIG. 2 which initiates start commands for the storage apparatus, s well as for the master and slave units. The slaves are started about 4 seconds after the master since they do not require as long to come up to speed, and in order to save tape in the slaves. The first window detection occurs approximately 15 seconds later at the beginning of lap 01 of the subsequent run to allow for the startup time required by the master and slaves. By that time the master and slave units are all operating with high stability and at full speed. Therefore, this point is the beginning of lap 01 of the subsequent run, and it also marks the beginning of program 01 since the record command is now applied to the slave units. From this point on, operation is the same as described for the initial run of FIG. 5A.

All subsequent runs using the same set of program parameters will also be identical. However, another initial run must be performed in the event the apparatus is stopped using the "-stop" pushbutton-indicator 66 of FIG. 2 since this action serves to clear the programming circuit. Also, if a new master tape is loaded into the storage apparatus, an initial run naturally must be performed to reference the apparatus to the new program parameters. Generally, an initial run is required at any time the unit is deenergized and all programmed parameters are cleared.

Figure 6:
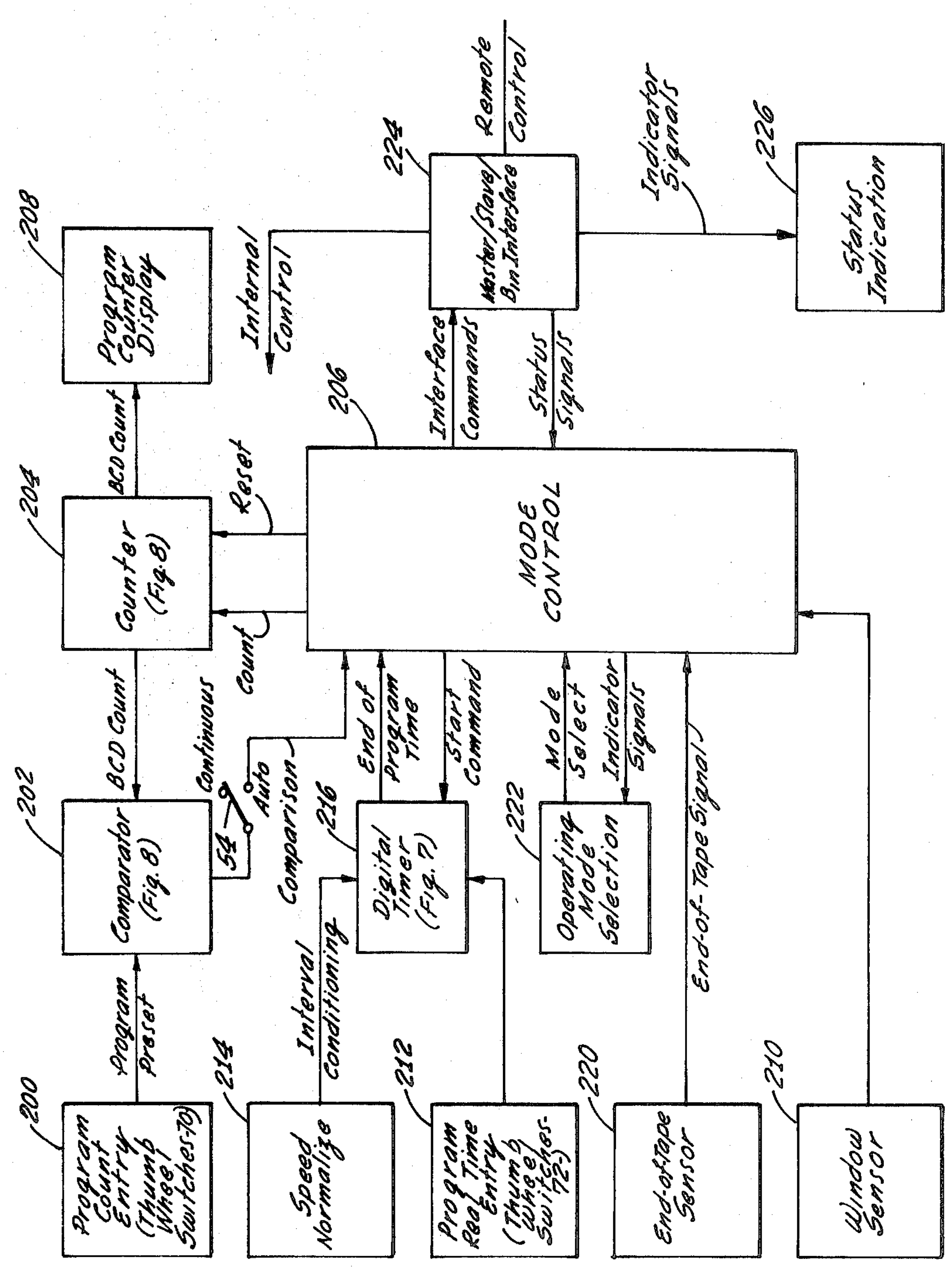
FIG. 6 is a block diagram of the control system to be described.

A block diagram of the control system for the apparatus of the invention is shown in FIG. 6. The program count entry block 200 of FIG. 6 includes the program preset digital thumb wheel switches 70 of FIG. 2. The output of this circuit determines the selected number of runs to be carried out, and it is applied as a comparison reference to a comparator circuit represented by the block 202. The system also includes a counter represented by the block 204. The counter is incremented by the count command from a mode control circuit represented by the block 206, and it is recycled by a reset command which is also derived from the mode control circuit.

The counter 204 supplies output signals to the comparator 202 which represent the count of the runs completed in a binary-coded decimal form. These latter signals are applied to the comparator 202 for comparison with the program reset count introduced into the comparator by the block 200, and the comparator develops an output when the two counts coincide. Specifically, the binary-coded decimal count from the counter 204 and the selected number of runs from the program count entry 200 are compared in the comparator 202, and when the programmed number of runs have been detected, a comparison signal is applied to the mode control circuit 206.

The aforesaid operation occurs only when the automatic/continuous switch 54 is set to "auto," the comparison signal causes the mode control circuit to initiate the required change in operating status of the equipment, such as "start," "record,""stop" and so on. The automatic/continuous switch 54 serves to inhibit the comparison signal from being transmitted to the mode control circuit 206 when in its "continuous" position, thus enabling the equipment to operate continuously for test or for special purposes. The automatic/continuous switch 54, as mentioned above, is normally set to the "auto" position.

The program counter display circuit, represented by the block 208 includes the two-place digital readout 52 of FIG. 2 and necessary logic to convert the binary-coded decimal count from the coder 204 to a decimal display. The window sensor circuit, as represented by the block 210 includes the lamp in lamp housing 106 of FIG. 4 and the photoelectric cell in the housing 108, and it generates a window-detected signal once for each lap of the tape 50, and applies this signal to the mode control circuit 206, so that the latter circuit may generate program count increment signals for the counter 204.

The program real time entry circuit represented by the block 212 includes the four-digital thumb wheel switches 72 of FIG. 2 and associated logic. This circuit serves to enable the operator to enter a selected program time in terms of minutes and seconds of real-time playback. The signal derived from this circuit establishes the upper counting limit for the digital timer 216.

The circuit includes a speed normalized circuit 214 which is switch controlled by the tape speed switch 50 of FIG. 2, and it enables the operator to set in the required interval timing condition to accommodate for various combinations of playback speed and duplication formats. The digital timer represented by the block 216 is conditioned by the selected program time from the block 212 and the interval conditioning signals from the block 214 to produce and end-of-program signal for the mode control circuit 206 when the desired program length for the particular selected duplication format has been reached. The end-of-program time signal is applied to the mode control circuit 206 which, in turn, returns a start command to initiate and recycle the digital timer sequence.

The digital timer 216, as will be described, is made up of a series of cascaded binary elements which are sequenced by a free-running clock. The outputs of the binary elements are weighted correspondingly to a standard binary code to convert the digital format into an accurate analog signal. The resulting analog signal is compared with the information developed by the program entry thumb wheel switches 72, and the resultant information constitutes the precise timing period which ultimately controls the starting of the slave units.

The end-of-tape sensor represented by the block 220 includes the end-of-tape sensor switch 102, and it detects when the tape tail leaves the magazine and generates a signal to the mode control circuit 206 to inhibit all functions related to tape motion, as will be described.

The operating mode selection circuit represented by the block 222 is controlled by the three pushbutton indicator switches 64, 66 and 68 of FIG. 2, and this circuit is used to control the apparatus. Mode selection signals generated by the selection circuit 222 are applied to the mode control circuit 206 for processing and distribution throughout the system as required to implement the selected mode, such as, for example, "run," "stop" or "unload." As the resulting mode signals are distributed, an indicator signal is returned to the operating mode selection circuit 222 to energize the switch cap of the activated control so as to provide the desired operating status indication.

The mode control circuit is the central processing and distributing circuit of the apparatus. Comparison, digital-timing, mode selection, window and end-of-tape, and status signals are combined, compared, gated and processed to generate control outputs so as to increment the counter 204, initiate the digital timer 216, energize the status indicators of the operating mode selection 222, and to provide interface commands to the master/slave/bin interface, as represented by the block 224.

The block 224 serves as a distribution point for both internal control and remote control signals, as well as status indication signals applied to the control panel of FIG. 2 so as to apprise to operator of the operating conditions of remote units, both slave and master. In addition to distribution, the interface circuit of the block 224 serves to drive and, where necessary, to delay the signals passed therethrough. The status indication block 226 of FIG. 6 includes the indicators 60 and 62 of FIG. 2, and these indicators are energized selectively by indicator signals derived from the interface circuit 224.

In the ensuing description, only those portions of the control system of FIG. 6 which are relevant to he actual controls and components of the present invention will be described in detail. Since the remaining controls do not apply directly to the present invention, and may incorporate known concepts and combinations, and since a detailed description of the controls is not necessary for the complete understanding of the present invention, no attempt will be made to encumber the record with such a detailed description.

Figure 7:
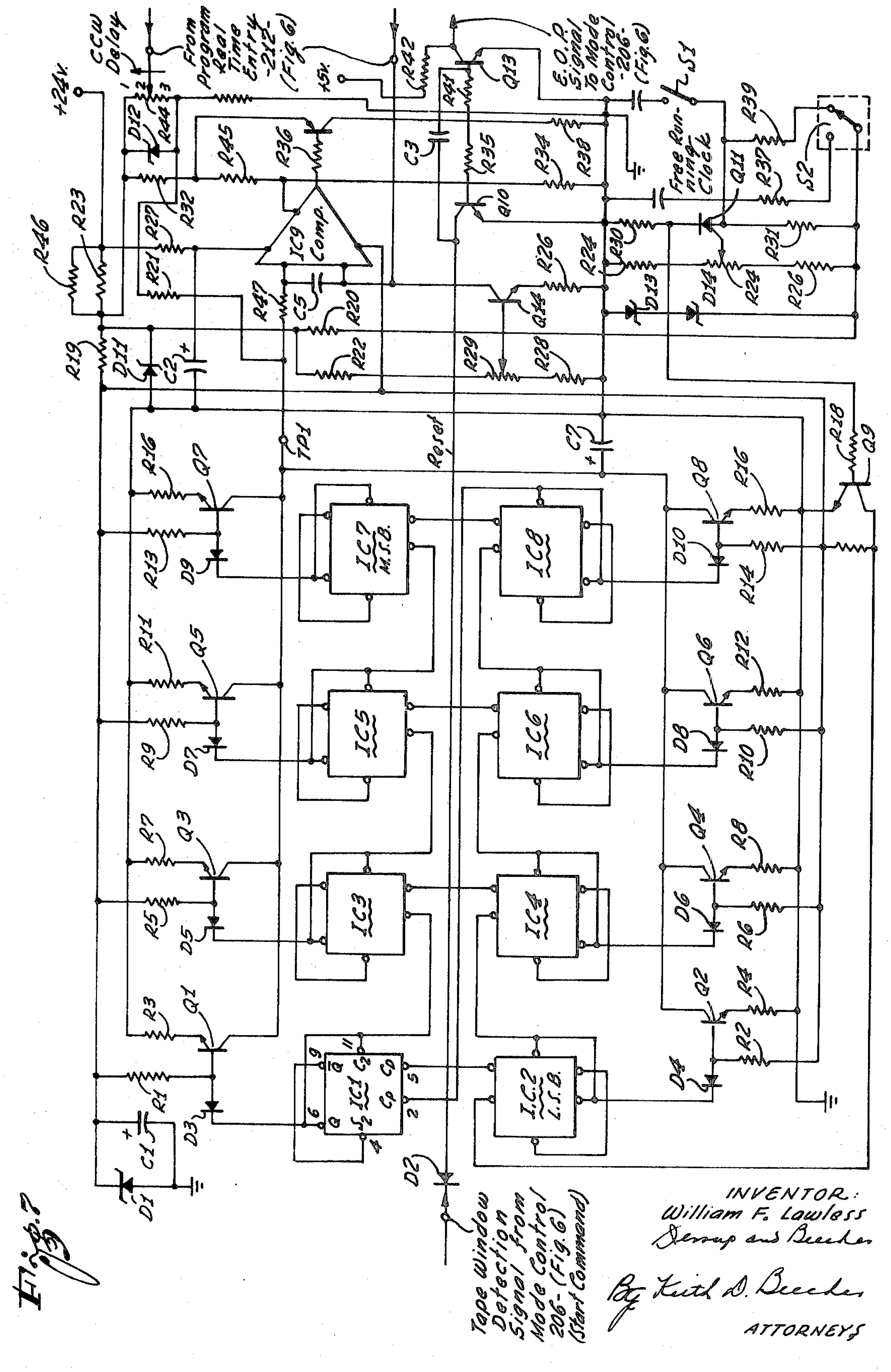
FIG. 7 is a diagram partly in block form and partly in circuit detail of a digital timer which is included in the apparatus.

The digital timer represented by the block 216 in FIG. 6 is shown in circuit detail in FIG. 7. This circuit serves to produce the desired control signal at the predetermined time interval before the end of each lap, as designated by the dotted lines A in FIG. 5. It will be remembered that such control signals are necessary before the end of each lap, so that the various controls for the master and slave units can e effectuated at the proper time to bring them up to speed quickly and efficiently, and with a minimum of lost motion.

Figure 8:
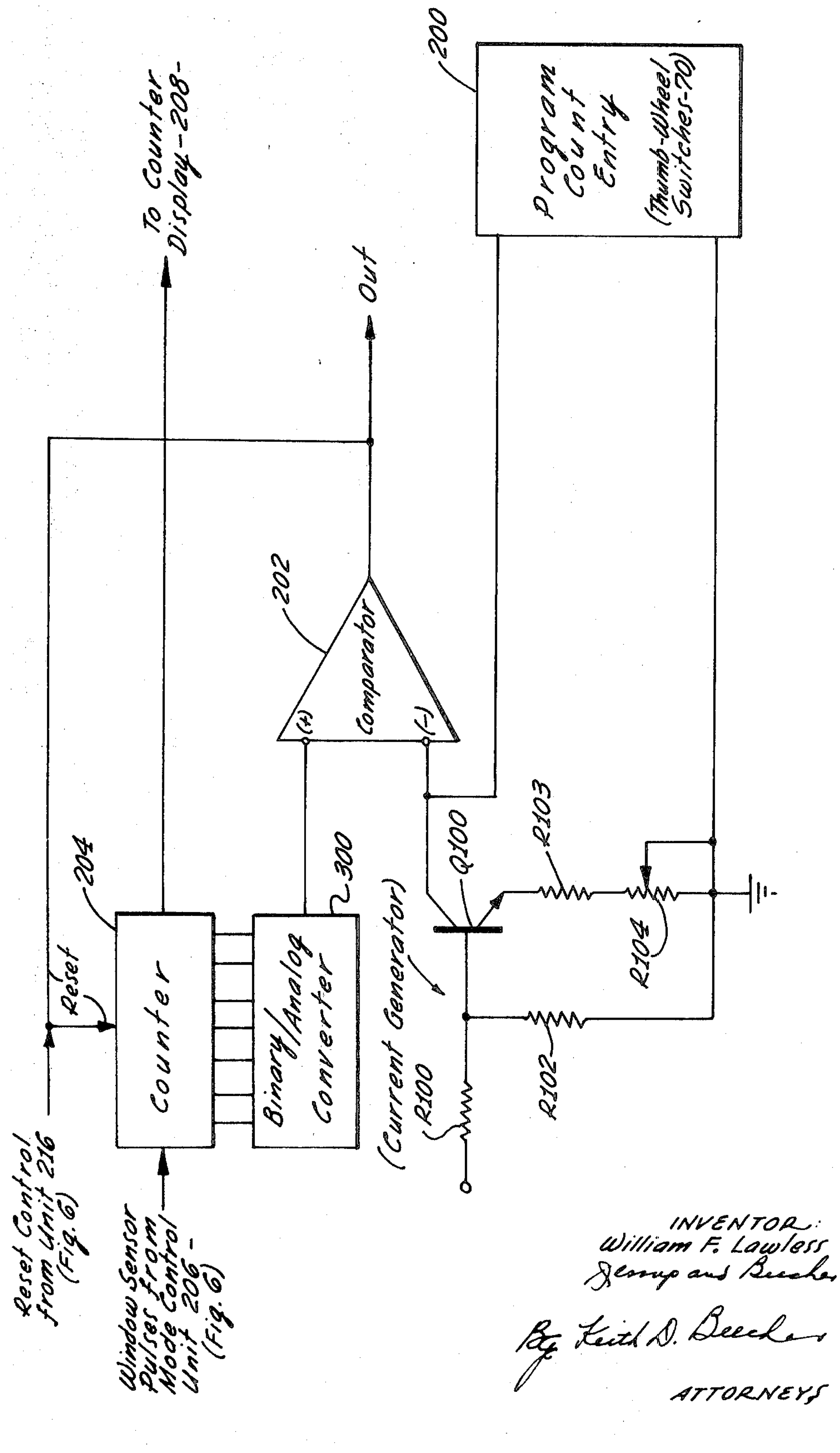
FIG. 8 is a diagram partly in block form and partly in circuit detail of counter and comparator control component of the apparatus.

The digital timer circuit of FIG. 8 is controlled by the program real-time entry circuit represented by the block 212 in FIG. 7, as well as by the speed normalize circuit represented by the block 214. When any particular tape bearing a prerecorded program is threaded into the apparatus of the present invention, the length of the program in real time is indicated on the tape, as well as the speed at which the program was recorded.

Then, the operator sets the thumb wheel switches 72 included in the block 212 so that the corresponding real time of the program may be entered into the machine; and he also sets certain speed-normalizing switches (to be described) associated with the speed-normalizing block 214 to set the apparatus of the invention, so that the apparatus may be normalized with the original speed of recording. With this information, the circuit of FIG. 8 is capable of generating a signal which corresponds exactly to the end of the particular tape which has been threaded into the apparatus.

That is, upon a window detection of the tape by the window sensor circuit represented by the block 210 in FIG. 6, the timer circuit of FIG. 8 is capable of generating an output signal at the precise moment at which the next window detection of the particular tape will occur. However, for purposes of the controls described above, it is necessary for the timer circuit of FIG. 8 to develop the aforesaid control signal a predetermined time before the next window detection, as represented by the dotted lines A in FIG. 5. This is achieved, as will be described, by "subtracting" a certain operational time from the time originally set into the timer circuit of FIG. 8 by the control of certain switches and of the thumb wheel switches 72 in the speed-normalizing and real-time entry circuits, as described above.

The circuit of FIG. 7 includes a binary-analog converter which includes a plurality of binary flip-flop elements designated $IC_1$–$IC_8$ respectively, and which are connected as a binary counter. Associated with the binary elements $IC_1$–$IC_8$ is a series of resistors $R_1$–$R_{17}$ having precisely selected valves. These resistors are controlled by semiconductor switches made up of the diodes $D_3$–$D_{10}$ and the NPN transistors $Q_1$–$Q_8$, so that as the binary counter proceeds from one step to the next, a different resistance value is connected, for example, across a 24-volt direct-current source and ground. The resistors are connected to that source through a resistor $R_{19}$, and a pair of parallel connected resistors $R_{23}$ and $R_{46}$. Stabilization is provided by Zener diodes $D_1$–$D_{11}$, the diode $D_1$ being shunted by a capacitor $C_1$, both being grounded as shown.

The binary counter made up of the aforesaid binary elements $IC_1$–$IC_8$ is triggered by a free-running clock oscillator which involves the circuit of a unijunction transistor $Q_{11}$. The output from the free-running clock oscillator is applied through an NPN transistor $Q_9$, and its associated resistors $R_{15}$ and $R_{18}$, to the binary element $IC_2$ which corresponds to the least significant bit in the binary counter. As the free-running clock oscillator generates pulses through the circuit of the transistor $Q_9$, the binary counter steps from one count to another.

For each succeeding count of the counter, an increasing current is drawn through the resistor $R_{21}$. The resistor 21 is connected through a resistor $R_{47}$ to one of the input terminals of a comparator circuit designated $IC_9$, which may be a known type of integrated circuit. The integrated circuit $IC_9$ has exciting terminals connected to the positive 2424source through a resistor $R_{27}$, and to ground respectively, and it has a further exciting terminal connected to the junction of a pair of resistors $R_{33}$ and $R_{34}$ which, together with an additional resistor $R_{32}$ are connected from the junction of the resistors $R_{19}$ and $R_{23}$ to ground.

The aforesaid free-running clock oscillator includes a potentiometer $R_{25}$ connected to the control gate of the unijunction transistor $Q_{11}$, and which is connected to the movable element of a switch $S_2$ through a resistor $R_{26}$, and which is also connected to a grounded resistor $R_{24}$. These resistors are shunted by a pair of Zener diodes $D_{13}$ and $D_{14}$. The anode of the unijunction transistor $Q_{11}$ is connected to the aforesaid movable element through a resistor $R_{31}$, and its cathode is connected to a grounded resistor $R_{30}$. The anode of the transistor $Q_{11}$ is also connected to a grounded capacitor $C_4$ and to a pair of resistors $R_{37}$ and $R_{39}$, as well as to a switch $S_1$. The resistors $R_{37}$ and $R_{39}$ are connected to various fixed contacts of the switch element $S_2$, whereas the switch $S_1$ is connected to a grounded capacitor $C_6$. The switch $S_1$, together with the switch $S_2$ constitutes the aforesaid normalizing switches which, as mentioned above, normalizes the apparatus with the predetermined speed at which the recording was originally made. These are the tape-normalizing switches included in the speed-normalize block 214 of FIG. 6.

The setting of the thumb wheel switches 72 in the program time entry block 212 of FIG. 6 introduces a predetermined voltage across the movable element of a potentiometer $R_{44}$ and a lead 3. The potentiometer $R_{44}$ is connected to the junction of the resistors $R_{19}$ and $R_{23}$, and to a grounded resistor $R_{45}$. The potentiometer is shunted by a Zener diode $D_{12}$. The lead 3 is connected to the second input terminal of the comparator $IC_9$, the input terminals being shunted by a capacitor $C_5$ which inhibits spurious action by the comparator.

The current flow through the lead 3 provides a comparison threshold for the comparator with respect to the ramp current flow through the resistor $R_{21}$, as the binary counter of the binary elements $IC_1$–$IC_8$ is stepped from one step to another. When the ramp current reaches the threshold established by the current in the lead 3, the comparator develops an output. If the adjustment of the current flow through the lead 3 is beyond the maximum count of the binary counter, the comparator produces an output when the maximum count is reached.

A manual adjustment for the current in the lead 3 is provided by a potentiometer $R_{29}$ which, together with a pair of resistors $R_{22}$ and $R_{28}$ is connected from the junction of the resistors $R_{19}$ and $R_{23}$ and ground. The movable element of the potentiometer $R_{29}$ is connected to the base of an NPN transistor $Q_{14}$ which serves as a current generator, and whose emitter is connected to a grounded resistor $R_{43}$ and whose collector is connected to the second input terminal of the comparator $IC_9$.

If the potentiometer $R_{44}$ were set to a value such that it effectively is removed from the circuit, the comparator $IC_9$ would develop an output signal corresponding to the actual lap time, that is, as explained above, at the precise moment that the next window detection would occur. However, the potentiometer $R_{44}$ may be adjusted so that the output from the comparator occurs at a predetermined time, for example, 10 seconds before the next window detection, and for the purposes described above.

The output of the comparator $IC_9$ is introduced through a resistor $R_{36}$ to the base of a PNP transistor $Q_{12}$. The emitter of the transistor is connected to the junction of the resistor $R_{32}$ and $R_{33}$, and its collector is connected to the junction of a pair of resistors $R_{38}$ and $R_{41}$. The resistor $R_{38}$ is grounded, and the resistor $R_{41}$ is connected to the base of an NPN transistor $Q_{13}$. The emitter of the transistor $Q_{13}$ is grounded, and its collector is connected through a resistor $R_{42}$ to the positive terminal of a 5-volt source.

The end of program signal is developed at the collector of the transistor $Q_{13}$. This signal, as described above, occurs a predetermined time before the end of each lap, as set by the potentiometer $R_{44}$. The output signal from the transistor $Q_{13}$ is also applied through a pair of resistors $R_{40}$ and $R_{35}$ to the base of an NPN transistor $Q_{10}$. The emitter of the transistor $Q_{10}$ is grounded, and its collector is connected to the reset terminals of the binary flip-flop elements $IC_1$–$IC_8$. A capacitor $C_3$ intercouples the collector of the transistor $Q_{10}$ to the base of the transistor $Q_{13}$. Therefore, each time the comparator develops an output signal, the output signal appears at the collector of the transistor $Q_{13}$, and the counter $IC_1$–$IC_8$ is reset, so that a new ramp is developed immediately. However, for the next lap, it is required that the ramp begin at the time of window detection, and not at the prior time represented by the dotted line A in FIG. 5. Therefore, a window detection signal is applied to the circuit from the mode control unit 206 of FIG. 6 through a diode $D_2$, so that all the flip-flops of the binary counter are again set at the beginning of the next lap, so that the ramp may be restarted at the proper time for the next operation.

In a constructed embodiment of the invention, the following circuit parameters were used, and these are given by way of example only, and are not intended to be limiting in any way:

$R_1$ . . . 8.2 kilohms
$R_2$ . . . 82 kilohms
$R_3$ . . . 1.6 kilohms
$R_4$ . . . 24 kilohms
$R_5$ . . . 3.9 kilohms
$R_6$ . . . 47 kilohms
$R_7$ . . . 820 ohms
$R_8$ . . . 13 kilohms
$R_9$ . . . 2 kilohms
$R_{10}$ . . . 27 kilohms
$R_{11}$ . . . 390 ohms
$R_{12}$ . . . 6.2 kilohms
$R_{13}$ . . . 1 kilohms
$R_{14}$ . . . 15 kilohms
$R_{15}$ . . . 4.7 kilohms
$R_{16}$ . . . 200 ohms
$R_{17}$ . . . 3.3 kilohms
$R_{18}$ . . . 100 ohms
$R_{19}$ . . . 510 ohms
$R_{20}$ . . . 560 ohms
$R_{21}$ . . . 270 ohms
$R_{22}$ . . . 3.3 kilohms
$R_{23}$ . . . 62 ohms
$R_{24}$ . . . 2.7 kilohms
$R_{25}$ . . . 500 ohms
$R_{26}$ . . . 1.8 kilohms
$R_{27}$ . . . 470 ohms
$R_{28}$ . . . 680 ohms
$R_{29}$ . . . 500 ohms
$R_{30}$ . . . 100 ohms
$R_{31}$ . . . 1.69 megohms
$R_{32}$ . . . 560 ohms
$R_{33}$ . . . 120 ohms
$R_{34}$ . . . 820 ohms
$R_{35}$ . . . 2.2 kilohms
$R_{36}$ . . . 2.2 kilohms
$R_{37}$ . . . 1.69 megohms
$R_{38}$ . . . 5.6 kilohms
$R_{39}$ . . . 562 kilohms
$R_{40}$ . . . 4.7 kilohms
$R_{41}$ . . . 5.6 kilohms
$R_{42}$ . . . 1 kilohms
$R_{43}$ . . . 22 kilohms
$R_{44}$ . . . 500 ohms
$R_{45}$ . . . 1 kilohms
$R_{46}$ . . . 62 ohms
$D_1$ . . . IN4733A
$D_{11}$ . . . IN5355B
$D_{12}$ . . . IN5221
$D_{13}$ . . . IN4733A
$D_{14}$ . . . IN4733A
$D_3$–$D_{10}$ . . . IN281
$C_1$ . . . 10 microfarads
$C_2$ . . . 10 microfarads
$C_3$ . . . 1 microfarad $C_4$ . . . 1 microfarad
$C_5$ . . . 0.0022 microfarad
$C_6$ . . . 1 microfarad
Transistors $Q_1$–$Q_{10}$ . . . 2N3643
$Q_{11}$ . . . D13T2
$Q_{12}$ . . . 2N3638
$Q_{13}$ . . . 1N281
$IC_1$–$IC_8$ . . . SN15845N As described above, the program preset thumb wheels 70 permit a control to be inserted into the machine, so that after a predetermined number of programs have been processed, the machine will stop. This is achieved, for example, by the system shown in FIG. 8, which system includes components similar to those described in conjunction with FIG. 7. The counter 204 referred to in FIG. 6 is incremented by the window sensor pulses derived from the mode control unit 206 of FIG. 6, so that the counter 204 will step for each completed lap through the machine. The output of the counter 204 is passed through a binary-analog converter, which may be similar to the circuitry described in conjunction with FIG. 7, and the current ramp output from the converter is applied to the comparator 202. Again, the comparator 202 may be similar to the comparator $IC_9$ of FIG. 7.

The output from the comparator serves to produce an output signal at the end of a predetermined number of laps, and this output signal is used to bring the equipment to a halt. The output from the comparator 202 is also used to reset the counter 204. The counter may also be reset on the introduction to the counter of an appropriate reset control from the mode control unit 216 of FIG. 6.

A transistor $Q_{100}$ is connected as a current generator circuit, similar to the transistor $Q_{14}$ in the circuit of FIG. 7. A resistor $R_{100}$ connects the base of the current generator to the positive potential source, and the base is also connected to a grounded resistor $R_{102}$. A resistor $R_{103}$ and a potentiometer $R_{104}$ connect the emitter of the transistor $Q_{100}$ to ground. The collector of the transistor $Q_{100}$ is connected to the negative input terminal of the comparator 202 to establish a current level at that input terminal. The current level is controlled by the setting of the thumb wheels 70 which, in turn, establishes the current generated by the circuit of the transistor $Q_{100}$.

Therefore, at the beginning of the operation, the counter 204 is reset by an appropriate reset control from the mode control unit 216. The current threshold from the current generator of the transistor $Q_{100}$ is then fed to a predetermined level by adjustment of the thumb wheels 70. Then, when the apparatus is started, the counter 204 causes the binary-analog converter 300 to generate a ramp which increases for each successive lap of operation of the tape through the apparatus. After a predetermined number of laps, as established by the setting of the thumb wheels 70, and as displayed by the counter display 208, the comparator generates an output which stops the machine, and which also resets the counter.

As mentioned above, the system of FIG. 8 is effective only when the switch 54, as shown in FIG. 6 is set to "auto." When the switch 54 is set to "continuous," the output from the comparator is prevented from reaching the mode control circuit of the unit 206, so that the apparatus operates continuously until otherwise stopped. This latter mode of operation is used only for test or special purposes.

Figure 9:
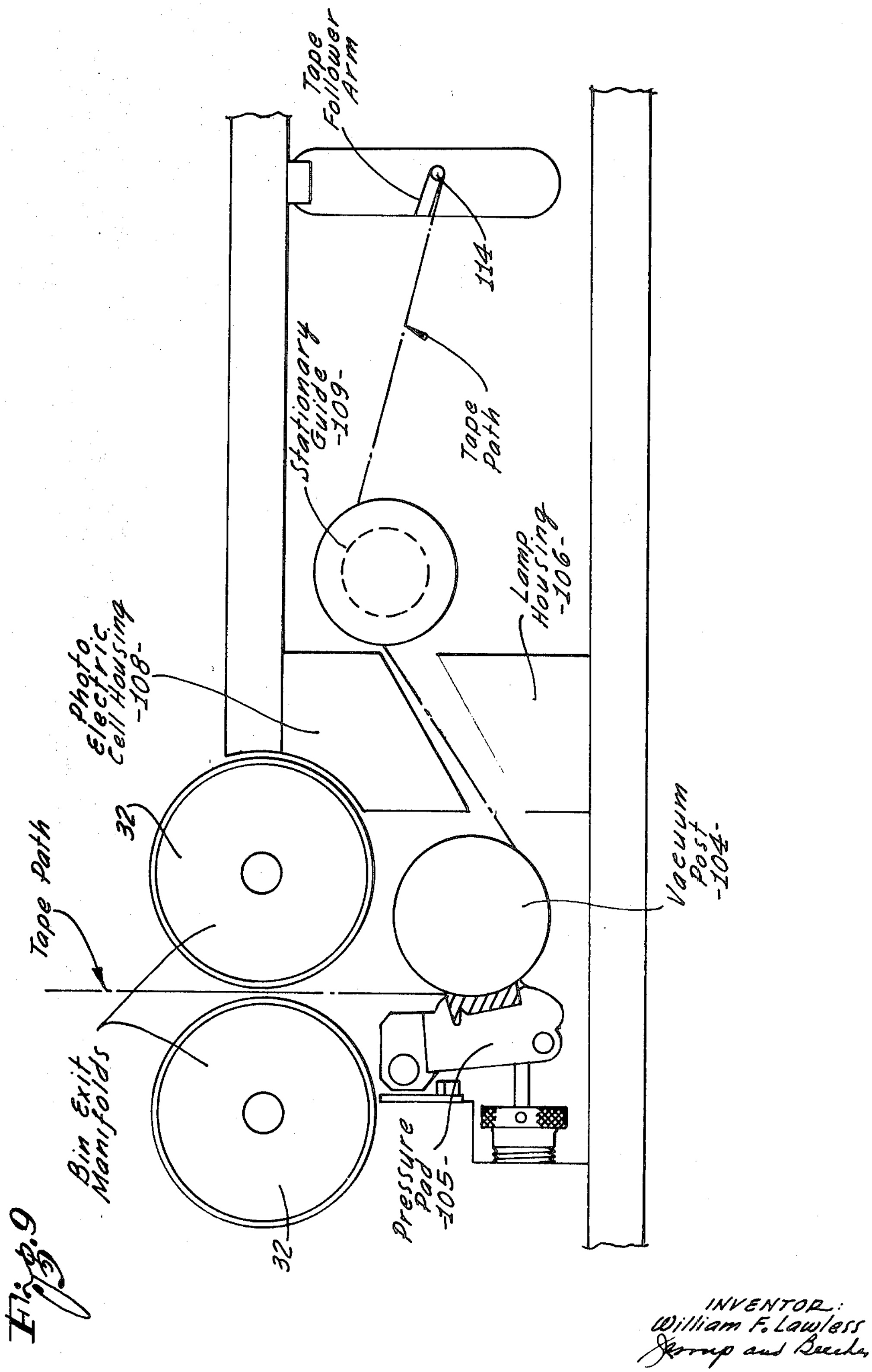
FIG. 9 is a schematic representation of a tape tension control mechanism located at the exit of the storage magazine.

After the tape leaves the storage magazine of the apparatus, and as shown in more detail in FIG. 9, it passes around the vacuum cleaning post 104, and through the lamp and photocell housings 106, 108, and thence around a stationary guide 109, after which it is engaged by the tape follower arm 114.

Figure 10:
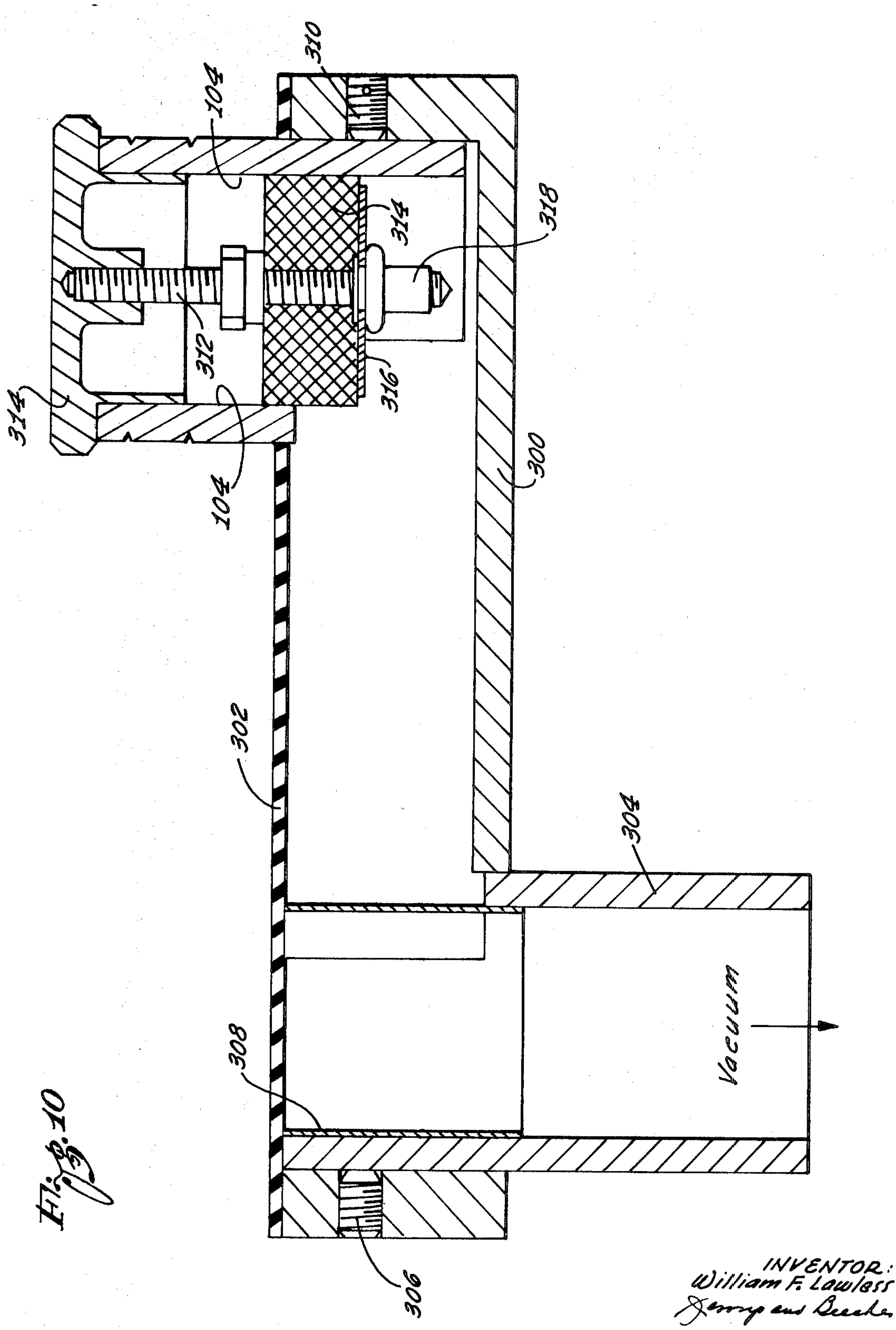
FIG. 10 is a vacuum post component of the aforesaid tape tension control mechanism.

The vacuum cleaning post 104 exerts a drag on the tape, so that a tension may be established on the tape as it is drawn across the tape follower arm 114. The tape follower arm responds to sudden losses of tension on the tape, due to loops, or the like, so as to maintain the tape under tension at all times, to prevent it from becoming entangled around the various components along its path. A pressure pad 105 is biased against the cleaning post 104, and other extraneous materials are removed from the tape as it passes around the vacuum cleaning post and between the post and the pressure pad. The vacuum cleaning post is shown in more detail in the sectional representation of FIG. 10.

The vacuum cleaning post 104 has slots extending partially around its periphery, nd these slots, together with the pressure pad 105 of FIG. 9 serve to withdraw the extraneous particles from the tape, and also serve to exert the required drag on the tape so that a tension may be created, as described above.

The post 104 is hollow, and it is supported in a duct 300 in an airtight relationship by means, for example, of a gasket 302. The duct, in turn, is supported on a tubing 304 by means of setscrews such as the setscrew 306, the tubing being coupled to the vacuum pump of the system. An auxiliary screen 308 may be supported at the end of the tubing 304 by any appropriate adhesive. The post 104 is supported in the duct 300 by means of setscrews, such as the setscrew 310. A rod 312 extends down through the post from a cap 314 which is fitted over the top end of the post. The rod 312 supports a filter element 314 and a screen 316, these latter elements being removably held on the rod 312 by means of a suitable fastener 318.

The post 104 develops a vacuum pressure at its peripheral surface, and when the tape is drawn around the surface, the extraneous matter on the tape is withdrawn and drawn by the suction pressure through the filter 315 where it is deposited.

Figures 11A, 12:
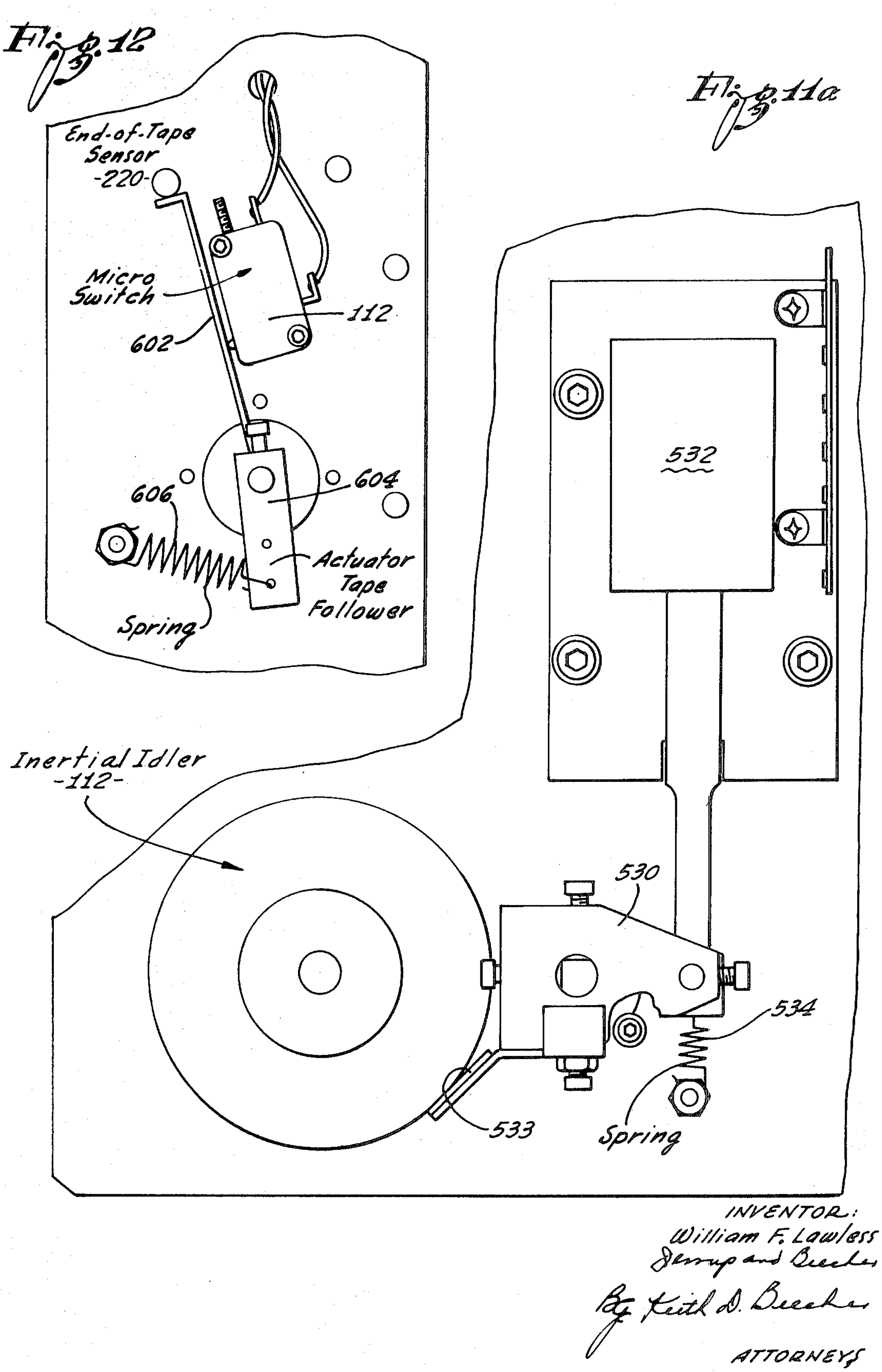
FIG. 11*a* and 11*b* illustrate other components of the tape tension control mechanism; of FIG. 9.
FIG. 12 is a view of a tape control tension switch which is included in the apparatus.
Figure 11B:
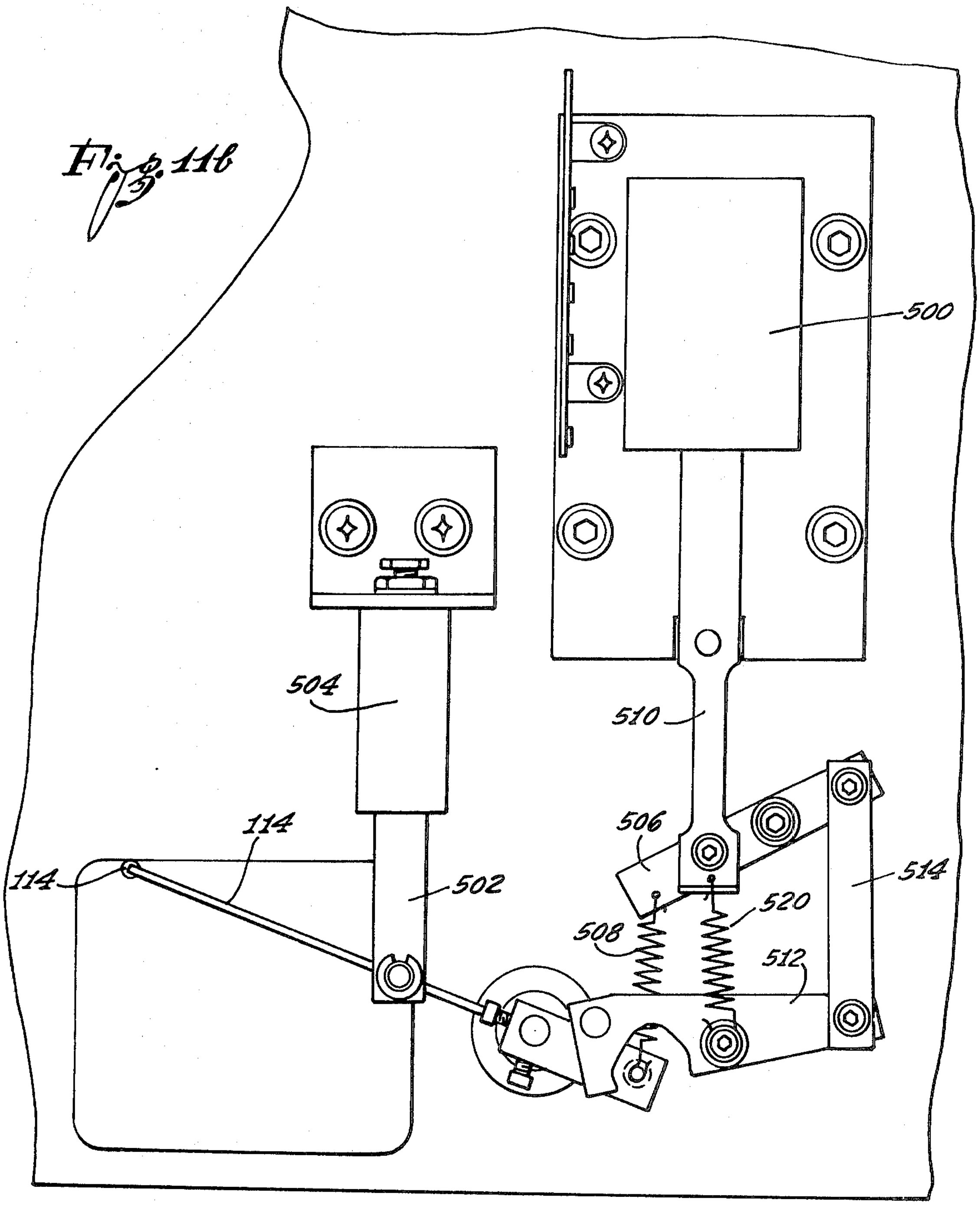

The controls associated with the tape follower arm 114 and with the inertia idler 112 are shown in some detail in FIGS. 11A and 11B. The components shown in FIGS. 11A and 11B are mounted on the under side of the mechanism, assuming that the representation of FIG. 4 is from the upper side. A solenoid 500 operates to move the tape follower arm 114 to the position shown in FIG. 4, and away from the tape 50 during the tape-threading operation.

The tape follower arm 114 is pivotally mounted on the movable member 502 of a pneumatic damper 504, and the right-hand end of the arm 114 in FIG. 11B is coupled to an upper actuating link 506 through a spring 508. The link 506 is pivotally coupled to the armature 510 of the solenoid 500. The other end of he link 506 is coupled to a lower actuating link 512 through a connecting link 514. The lower actuating link is pivotally mounted on the mounting chassis. A spring 520 couples the armature 510 to the stationary pivot point of the actuating link 512.

The left-hand end of the actuating link 502 is also coupled to the arm 114. The linkage arrangement is such that when the solenoid 500 is energized, the armature 510 moves towards the upper margin in FIG. 11B, against the tension of the spring 520. Such movement of the armature causes the linkage 506, 514 and 512 to move the left-hand end of the arm 114 in a counterclockwise direction, and into operating condition with the tape 50.

The tape follower arm 114 is spring biased against the tape, when in its operative position, by the spring 508, the latter spring being placed into tension by the rotation of the upper actuating arm 506 in a clockwise direction when the solenoid 500 is energized. However, when the solenoid is deenergized, the tension of the spring 508 is released, and the linkage 506, 514 and 512 biases the arm into its displaced position with respect to the tape, the arm being illustrated in the standby position in FIG. 10.

When the arm 114 is spring biased against the tape in its operative position, it follows the tape so as to maintain it in tension, in the presence of abrupt changes in tension of the tape. The dash pot, or pneumatic damper 504 provides the follower 114 with nonlinear dynamic characteristics. That is, the tension exerted by the arm 114 is a linear for small displacements, but becomes more and more nonlinear, as the deflection amplitudes increase.

The tape follower mechanism described above works in conjunction with the inertial wheel 112 which, in conjunction with the associated pitch roller 116 of FIG. 4 draws the tape across the tape follower arm, with the vacuum cleaning post providing the necessary drag on the tape, as explained above, so that the tape will be in tension as it is drawn across the tape follower arm 114.

The inertial idler 112 has a brake assembly 530 associated with it, as shown in FIG. 11A, the brake being actuated by a solenoid 532. Whenever the solenoid 532 is deenergized, which occurs simultaneously with the release of the pinch roller 116 from the idler 112, a spring 534 pivots the brake assembly 530, so that a brake band 532 is moved into contact with the idler 112, rapidly bringing the idler to a halt. The idler 112 has a flywheel effect when the tape is operative, and serves to smooth out perturbances in the tape drive.

It will be appreciated that the assembly described above in conjunction with FIGS. 11A and 11B is such that the tape follower arm 114 asserts a force against the tape which serves to hold the tape under tension for the reasons described above. Slight changes in the tension on the tape produce corresponding displacements of the tape follower arm in a linear relationship for the smaller displacements. However, as the displacements become greater and greater, more force is required due to the action of the dash pot 504. This results in a mechanism for maintaining tape tension, and one which has an inherently wide dynamic range.

The end of tape sensor 102 of FIG. 4, which is located near the entrance to the magazine, is shown in somewhat more detail in FIG. 12. A microswitch 600 is mounted on the underside of the chassis, and the microswitch is operated by a control arm 602. The control arm is pivoted at one end, and the other end bears against the tape 50. The arm 602 is normally biased against the operating button of the switch 600 by a pivoted actuator member 604 and spring 606. Whenever the tape tension falls below a predetermined minimum, the mechanism of FIG. 12 operates so as to actuate the switch and stop the apparatus.

The end of tape sensor 102 is used to detect any loss in tape tension while the mechanism is running. This is essential because any slackness in the tape tends to cause wrappage around the various components, so that tape movement must be stopped immediately in the event of lack of tension due to breakage or any other reason. The end of tape sensor is also used during loading of a new tape into the machine, and it is controlled to stop the loading at the precise moment that the new tape has been loaded into the magazine, but with a tail extending from the entrance so that the tape may be spliced with the aforesaid tape window into the loop.

The tension in the end of tape sensor 102 is controlled so that during loading of the tape, it senses a release in tension on the tape between the drive capstan 28 at the entrance to the storage bin and the capstan of the master recorder. This release occurs as soon as the end of the tape passes through the capstan/pinch roller combination at the master unit. At that moment, there still is sufficient tape between the entrance to the bin and the master unit to permit the sensor 120 to actuate the pinch roller 30 and release the tape drive. This latter operation is made to occur sufficiently rapidly so that there still is a tail of tape protruding form the bin for splicing purposes.

The sensor 102 may also be used during normal run of the tape to sense the release of the capstan/pinch roller combination of the master whenever the tape motion is stopped, and so that a similar control may be automatically exerted on the pinch roller 30 in the storage apparatus. However, this latter control should be slower than the end of tape sensing during loading. For that reason, a further switch (not shown) is provided which is operated by the tape follower arm 114 of FIG. 4. During loading, there is no tension in the tape at the exit of the bin so the tape follower arm is in a limit position. During normal operation, the tape tension causes the arm to move from its limit position and actuate the last-mentioned switch. When the switch is actuated, the tension of the sensor 102 is increased by any appropriate solenoid control means (not shown). This delays the control exerted thereby on the pinch roller 30 to some extent so that the capstan 28 in the storage apparatus drives the tape for a brief moment after the capstan in the master unit has been released to avoid ravelling of the tape around the capstans with resultant damage to the equipment.

What is claimed is:

1. In a tape drive system, or the like, a drive mechanism; control means for indicating the initiation of an operative cycle for said system by said drive mechanism; a timer circuit coupled to said control means and activated thereby; first adjustable means coupled to said timer circuit for introducing a time factor into said timer circuit so as to cause said timer circuit to develop an output signal a predetermined established time interval after the activation thereof by said control means, said predetermined established time interval being determined by the setting of said first adjustable means; and further adjustable means included in said timer circuit for causing said timer circuit to develop said output signal a predetermined time interval before the aforesaid established time, said predetermined time interval being established by the setting of said further adjustable means.

2. The combination defined in claim 1, and in which said time circuit includes a digital binary counter, a binary-analog conversion network coupled to said counter, a free-running clock generator coupled to said counter for driving said counter, and comparator means for developing an output signal when the output of said conversion network coincides with a predetermined signal level as set by said first adjustable means and by said further adjustable means.

3. The combination defined in claim 2, and which includes adjustable normalizing switching means included in said clock generator circuit to establish the operating frequency thereof.

4. The combination defined in claim 1, in which said drive mechanism drives an endless tape, and which includes a transparent window member affixed in said tape, and photoelectric sensor means for detecting the passage of said window past a predetermined point, said photoelectric sensor means being coupled to said control mans to cause said control means to activate said timer circuit at times determined by said passage of said transparent window member.

5. The combination defined in claim 1, in which said first adjustable means introduces a real-time factor into said timer circuit.

6. The combination defined in claim 1, and which includes control circuitry having counter means coupled to said drive mechanism to determine the number of operative cycles undergone by said system after the initiation of said drive mechanism, and adjustable means coupled to said control circuitry for causing said control circuitry to develop an output signal after a certain number of said operational cycles as determined by the setting of said last-named adjustable means; and circuit means coupled to said control circuitry and responsive to said output signal for stopping said drive mechanism after said certain number of operative cycles.

7. In a tape storage and drive apparatus, or the like, a magazine for storing the tape, a drive mechanism for circulating the tape in and out of said magazine; a post mounted externally of said magazine to be contacted by said tape, as the tape is drawn along a predetermined path by said drive mechanism; a tape follower arm positioned adjacent said tape path and spring biased into operative engagement with said tape to maintain a tension on said tape; and a pneumatic damper coupled to said spring-biased tape follower arm, so that said arm exhibits essentially linear tension versus displacement characteristics throughout a predetermined range, and nonlinear force versus displacement characteristics outside of said predetermined range.

8. The combination defined in claim 7 in which said post exerts a drag on said tape so as to maintain the tape in tension as it is drawn across said tape follower arm.

9. The combination defined in claim 8, in which said post includes peripheral slots, and means for establishing a vacuum pressure at said slots so as to exert a force on the tape as it is drawn around said post.

10. In a tape drive system for use with a master recording unit having a predetermined tape speed, a storage bin, a controllable pinch roller and drive capstan combination for drawing the tape from said master recording unit and into said bin, a control means for setting said drive capstan in a constant torque mode independent of speed so as to maintain a predetermined tape tension between said master recording unit and said pinch roller and drive capstan combination.

11. In a tape drive system for use with a master recording unit, or the like, a storage bin, a controllable pinch roller and drive capstan combination for drawing the tape from the master recording unit and into said bin, and a tape-tension-sensing means mounted on said storage bin adjacent the entrance thereto and resiliently biased against the tape entering the bin, and an electric switch mechanically coupled to said sensing means for controlling said pinch roller and drive capstan combination between a tape drive mode and idler mode of operation.

UNITED STATES PATENT OFFICE
CERTIFICATE OF CORRECTION

Patent No. 3,608,798 Dated September 28, 1971

Inventor(s) WILLIAM F. LAWLESS

It is certified that error appears in the above-identified patent and that said Letters Patent are hereby corrected as shown below:

| | | | |
|---|---|---|---|
| Col. 3, | line 25, | before "valve" insert --air-- | ; |
| | line 45, | change "programm" to --program-- | . |
| Col. 4, | line 8, | change "he" to --the-- | ; |
| | line 37, | change "present" to --preset-- | . |
| Col. 5, | line 58, | change "in" to --is-- | . |
| Col. 6, | line 4, | change "s well" to --as well-- | . |
| Col. 7, | line 59, | change "to operator" to --the operator-- | ; |
| | line 68, | change "to he" to --to the-- | . |
| Col. 8, | line 7, | change "e effectuated" to --be effectuated-- | ; |
| | line 73, | change "2424" to --24-volt-- | . |
| Col. 12, | line 6, | change "nd" to --and-- | ; |
| | line 41, | change "of he link" to --of the link-- | . |
| Col. 13, | line 57, | change "form" to --from-- | . |
| Col. 14, | line 23, | change "time" to --timer-- | ; |
| | line 38, | change "mans" to --means-- | . |

Signed and sealed this 31st day of October 1972.

(SEAL)
Attest:

EDWARD M.FLETCHER,JR.
Attesting Officer

ROBERT GOTTSCHALK
Commissioner of Patents